United States Patent [19]
Ando et al.

[11] Patent Number: 5,754,969
[45] Date of Patent: May 19, 1998

[54] AUTOMATIC TRANSMISSION SYSTEM WITH LOCK-UP CLUTCH

[75] Inventors: Yoriaki Ando, Nagoya; Naoki Hakamada, Okazaki, both of Japan

[73] Assignee: Nippon Soken, Inc., Nishio, Japan

[21] Appl. No.: 579,978

[22] Filed: Dec. 28, 1995

[30] Foreign Application Priority Data

Jan. 23, 1995 [JP] Japan ................. 7-008395

[51] Int. Cl.[6] ................................. G06G 7/70
[52] U.S. Cl. ................. 701/67; 701/51; 701/68; 477/120; 477/72; 477/174; 192/103 F
[58] Field of Search ................. 364/424.08, 424.081, 364/424.082, 424.083, 424.084, 424.085, 424.086, 424.087, 424.088, 424.091, 424.095, 424.093; 477/148, 174–176, 107–109, 154, 155, 120; 180/248, 197; 74/333, 335; 475/66, 71, 200, 85, 87, 120; 192/103 F

[56] References Cited

U.S. PATENT DOCUMENTS

| | | | |
|---|---|---|---|
| 4,019,614 | 4/1977 | Prenzel et al. | 192/103 F |
| 4,224,842 | 9/1980 | Rabus et al. | 477/120 |
| 4,244,244 | 1/1981 | Rembold et al. | 477/120 |
| 4,295,551 | 10/1981 | Zimmermann et al. | 477/89 |
| 4,576,263 | 3/1986 | Lane et al. | 477/72 |
| 4,691,285 | 9/1987 | Takeda | 364/424.083 |
| 4,873,637 | 10/1989 | Braun | 364/424.096 |
| 4,975,844 | 12/1990 | Holbrook et al. | 364/424.092 |
| 5,016,724 | 5/1991 | Steinhagen et al. | 180/197 |
| 5,257,675 | 11/1993 | Araki et al. | 475/66 |
| 5,316,116 | 5/1994 | Slicker et al. | 364/431.07 |
| 5,323,667 | 6/1994 | Tweed et al. | 364/424.089 |
| 5,439,428 | 8/1995 | Slicker | 364/424.097 |
| 5,609,552 | 3/1997 | Furuya et al. | 477/174 |

FOREIGN PATENT DOCUMENTS

| | | |
|---|---|---|
| 60-078156 | 5/1985 | Japan . |
| 60-263774 | 12/1985 | Japan . |
| 6-012144 | 2/1994 | Japan . |

*Primary Examiner*—Jacques H. Louis-Jacques
*Attorney, Agent, or Firm*—Cushman Darby & Cushman IP Group of Pillsbury Madison & Sutro LLP

[57] ABSTRACT

An automatic transmission system with a lock-up clutch for use with an engine includes an automatic transmission having an input shaft and an output shaft. A torque converter with a lock-up clutch is provided between the input shaft of the automatic transmission and an output shaft of the engine. A first device calculates a measure of time-domain variation in the rotational speed of the output shaft of the engine. A second device detects whether or not the measure of time-domain variation in the rotational speed of the output shaft of the engine exceeds a predetermined threshold value. A third device changes the condition of the lock up when the second device detects that the measure of time-domain variation exceeds the threshold value. A similar system is operable when the second device calculates a measure of time-domain variation in the rotational speed of the output shaft or the input shaft of the automatic transmission. A similar system is also operable when such measurements from the engine and the automatic transmission are combined.

9 Claims, 10 Drawing Sheets

AUTOMATIC TRANSMISSION SYSTEM WITH LOCK-UP CLUTCH

BACKGROUND OF THE INVENTION

1. Field of the Invention

This invention relates to an automatic transmission system for a vehicle which has a lock-up function.

2. Description of the Prior Art

Generally, automatic transmissions for automotive vehicles include a torque converter connected between the output shaft of an engine and the input shaft of a transmission main portion. The efficiency of power transmission via the torque converter is relatively low.

Some automatic transmissions are movable into and out of a lock-up made of operation. During the lock-up mode of operation, a clutch in the automatic transmission directly couples the input side and the output side of a torque converter, and thereby locks up the torque converter. Under given operating conditions of a related automotive vehicle or a related engine, the lock-up mode of operation of the automatic transmission is thereby executed. The execution of the lock-up mode of operation improves the efficiency of power transmission via the automatic transmission.

Japanese published unexamined patent applications 60-78156 and 60-263774 disclose lock-up type automatic transmissions. In each of Japanese applications 60-78156 and 60-263774, the automatic transmission is moved out of the lock-up mode of operation when the rate of a variation in the rotational engine speed reaches a given value. The movement of the automatic transmission out of the lock-up mode of operation is done to suppress or prevent a shock upon a gear shift.

Japanese published examined patent application 6-12144 discloses a control apparatus for a lock-up clutch connected to a torque converter. In Japanese application 6-12144, the torque converter is moved out of the lock-up mode of operation in response to the degree of opening of an engine throttle valve.

SUMMARY OF THE INVENTION

It is an object of this invention to provide an improved automatic transmission system for a vehicle.

A first aspect of this invention provides an automatic transmission system for use with an engine and comprises: an automatic transmission having an input shaft; first means for providing lock up between the input shaft of the automatic transmission and an output shaft of the engine; second means for calculating a measure of time-domain variation in a rotational speed of the output shaft of the engine; and third means for calculating a measure of variation in a rotational speed of the input shaft of the automatic transmission. For the purpose of detection, the system also comprises: fourth means connected to the second means, for detecting whether or not the measure of time-domain variation in the rotational speed of the output shaft of the engine, which is calculated by the second means, exceeds a first predetermined threshold value; and fifth means connected to the third means, for detecting whether or not the measure of time-domain variation in the rotational speed of the input shaft of the automatic transmission, which is calculated by the third means exceeds a second predetermined threshold value. And for the purpose of adjustment, the system also comprises; sixth means connected to the first means, the fourth means, and the fifth means, for changing a condition of the lock up when at least one of the fourth means and the fifth means detects that the measure of time-domain variation exceeds the threshold value.

A second aspect of this invention provides an automatic transmission system for use with an engine comprises: an automatic transmission having an input shaft and an output shaft; first means for providing lock up between the input shaft of the automatic transmission and an output shaft of the engine; second means for calculating a measure of time-domain variation in a rotational speed of the output shaft of the engine; and third means for calculating a measure of time-domain variation in a rotational speed of the output shaft of the automatic transmission. For the purpose of detection, the system also comprises: fourth means connected to the second means, for detecting whether or not the measure of time-domain variation in the rotational speed of the output shaft of the engine, which is calculated by the second means exceeds a first predetermined threshold value; and fifth means connected to the third means, for detecting whether or not the measure of time-domain variation in the rotational speed of the output shaft of the automatic transmission, which is calculated by the third means exceeds a second predetermined threshold value. And for the purpose of adjustment, the system also comprises: sixth means connected to the first means, the fourth means, and the fifth means, for changing a condition of the lock up when at least one of the fourth means and the fifth means detects that the measure of time-domain variation exceeds the threshold value.

A third aspect of this invention is based on the first aspect thereof and provides an automatic transmission system wherein the sixth means comprises: means for changing the condition of the lock up from a full lock-up state to a slip state, and means for changing the condition of the lock up from the slip state to a lock-up canceled state.

A fourth aspect of this invention is based on the second aspect thereof and provides an automatic transmission system wherein the sixth means comprises: means for changing the condition of the lock up from a full lock-up state to a slip state, and means for changing the condition of the lock up from the slip state to a lock-up canceled state.

A fifth aspect of this invention provides an automatic transmission system for use with an engine and comprises: an automatic transmission having an input shaft; first means for providing lock up between the input shaft of the automatic transmission and an output shaft of the engine; second means for calculating a second-order differential of a rotational speed of the output shaft of the engine with respect to time; and third means for calculating a second-order differential of a rotational speed of the input shaft of the automatic transmission with respect to time. For the purpose of detection, the system also comprises: fourth means connected to the second means for detecting whether or not the second-order differential of the rotational speed of the output shaft of the engine, which is calculated by the second means, exceeds a first predetermined threshold value; and fifth means connected to the third means, for detecting whether or not the second-order differential of the rotational speed of the input shaft of the automatic transmission, which is calculated by the third means exceeds a second predetermined threshold value. And for the purpose of adjustment, the system also comprises sixth means connected to the first means, the fourth means, and the fifth means, for changing a condition of the lock up when at least one of the fourth means and the fifth means detects that the second-order differential exceeds the threshold value.

A sixth aspect of this invention provides an automatic transmission system for use with an engine comprises: an automatic transmission having an input shaft and an output shaft; first means for providing lock up between the input shaft of the automatic transmission and an output shaft of the engine; second means for calculating a second-order differential of a rotational speed of the output shaft of the engine with respect to time; and third means for calculating a second-order differential of a rotational speed of the output shaft of the automatic transmission with respect to time. For the purpose of detection, the system also comprises fourth means connected to the second means for detecting whether or not the second-order differential of the rotational speed of the output shaft of the engine, which is calculated by the second means, exceeds a first predetermined threshold value; and fifth means connected to the third means, for detecting whether or not the second-order differential of the rotational speed of the output shaft of the automatic transmission, which is calculated by the third means, exceeds a second predetermined threshold value. And for the purpose of adjustment, the system also comprises sixth means connected to the first means, the fourth means, and the fifth means, for changing a condition of the lock up when at least one of the fourth means and the fifth means detects that the second-order differential exceeds the threshold value.

A seventh aspect of this invention is based on the first aspect thereof, and provides an automatic transmission system further comprising seventh means for calculating a measure of time-domain variation in a difference between the rotational speed of the output shaft of the engine and the rotational speed of the input shaft of the automatic transmission. For the purpose of detection, the system also comprises eighth means connected to the seventh means, for detecting whether or not the rate of the time-domain variation in the difference, which is calculated by the seventh means, exceeds a third predetermined threshold value. And for the purpose of adjustment, the system also comprises ninth means connected to the first means and the eighth means, for changing the condition of the lock up from a slip control state to a lock-up canceled state when the eighth means detects that the rate of the time-domain variation exceeds the third predetermined threshold value.

DESCRIPTION OF THE PREFERRED EMBODIMENTS

First Embodiment

Figure 1:
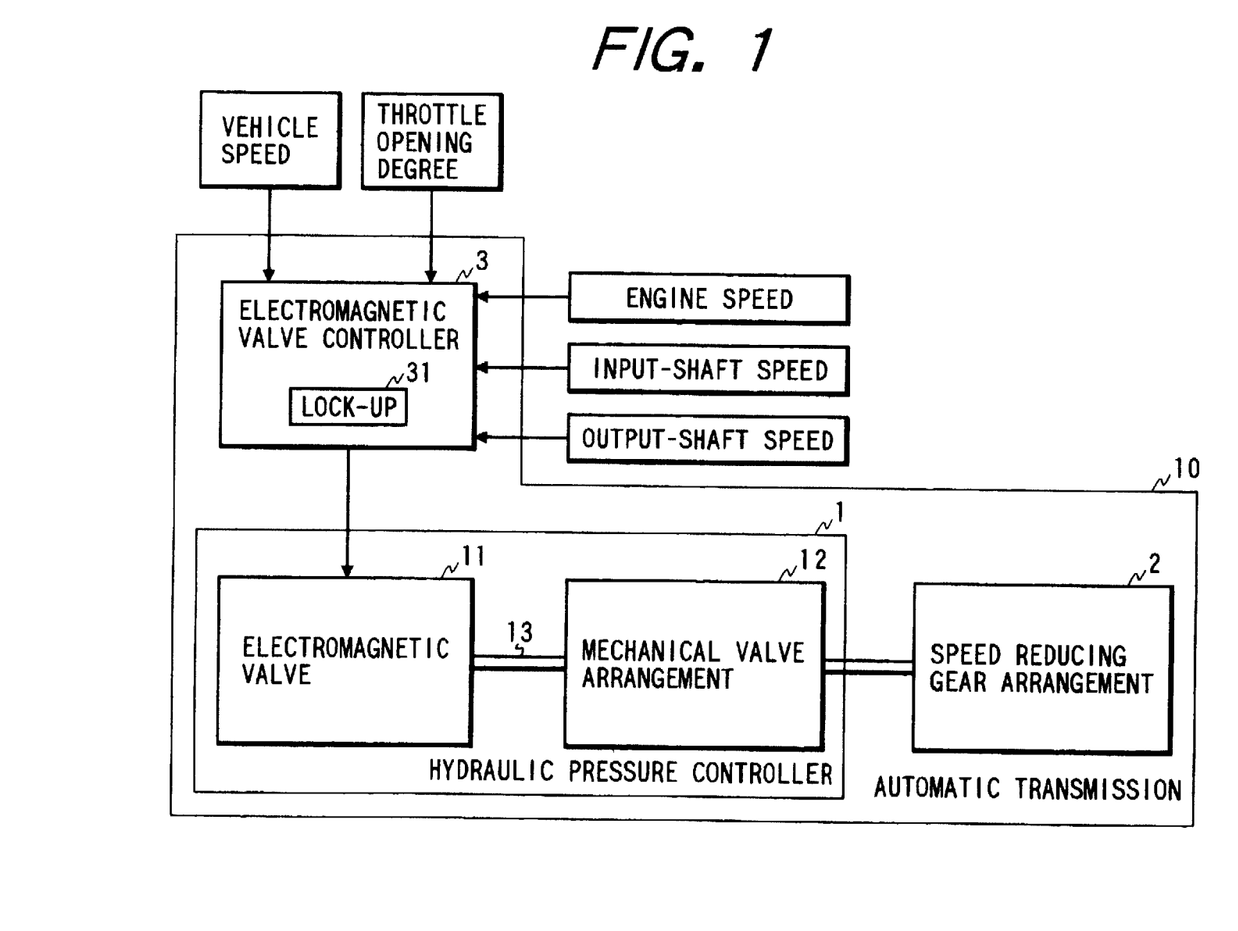
FIG. 1 is a diagram of an automatic transmission system according to a first embodiment of this invention.

With reference to FIG. 1, an automatic transmission 10 includes a hydraulic pressure controller 1 and a speed reducing gear arrangement 2. The hydraulic pressure controller 1 has an electromagnetic valve (a solenoid valve) 11, a mechanical valve arrangement 12, and a hydraulic fluid passage 13 connecting the electromagnetic valve 11 and the mechanical valve arrangement 12.

The speed reducing gear arrangement 2 is connected to the mechanical valve arrangement 12. The speed reducing gear arrangement 2 includes frictional elements (frictional devices or members) such as a clutch and a brake. The activation and the deactivation of the frictional elements are controlled by the hydraulic pressure controller 1. The speed reducing gear arrangement 2 serves to execute a gear shift providing a variation in the change gear ratio.

The automatic transmission 10 includes an electromagnetic valve controller 3 electrically connected to the electromagnetic valve 11. The electromagnetic valve controller 3 is also electrically connected to various sensors including a vehicle speed sensor, an engine throttle valve position sensor, an engine speed sensor, an input-shaft speed sensor, and an output-shaft speed sensor. The electromagnetic valve controller 3 receives the output signals of these sensors which represent the speed of a related vehicle, the degree of opening of a related engine throttle valve (the position of the related engine throttle valve), the rotational speed of a related engine, the rotational speed of an input shaft of the automatic transmission 10, and the rotational speed of an output shaft of the automatic transmission 10. In other words, the electromagnetic valve controller 3 receives the vehicle speed signal, the throttle opening degree signal (the throttle position signal), the engine speed signal, the input-shaft speed signal, and the output-shaft speed signal. The electromagnetic valve controller 3 generates a control signal in response to the sensor output signals, and feeds the generated control signal to the electromagnetic valve 11 to control the latter. The control signal to the electromagnetic valve 11 is changeable among different states including states which correspond to a command of executing lock up, a command of removing or canceling lock up, and a command of executing slip control respectively.

The electromagnetic valve controller 3 includes a microcomputer or a similar device having a combination of an I/O port, a CPU, a RAM, and a ROM. The electromagnetic valve controller 3 operates in accordance with a program stored in the ROM. The electromagnetic valve controller 3 forms a lock-up controller 31 provided by a software (the program).

Figure 2:
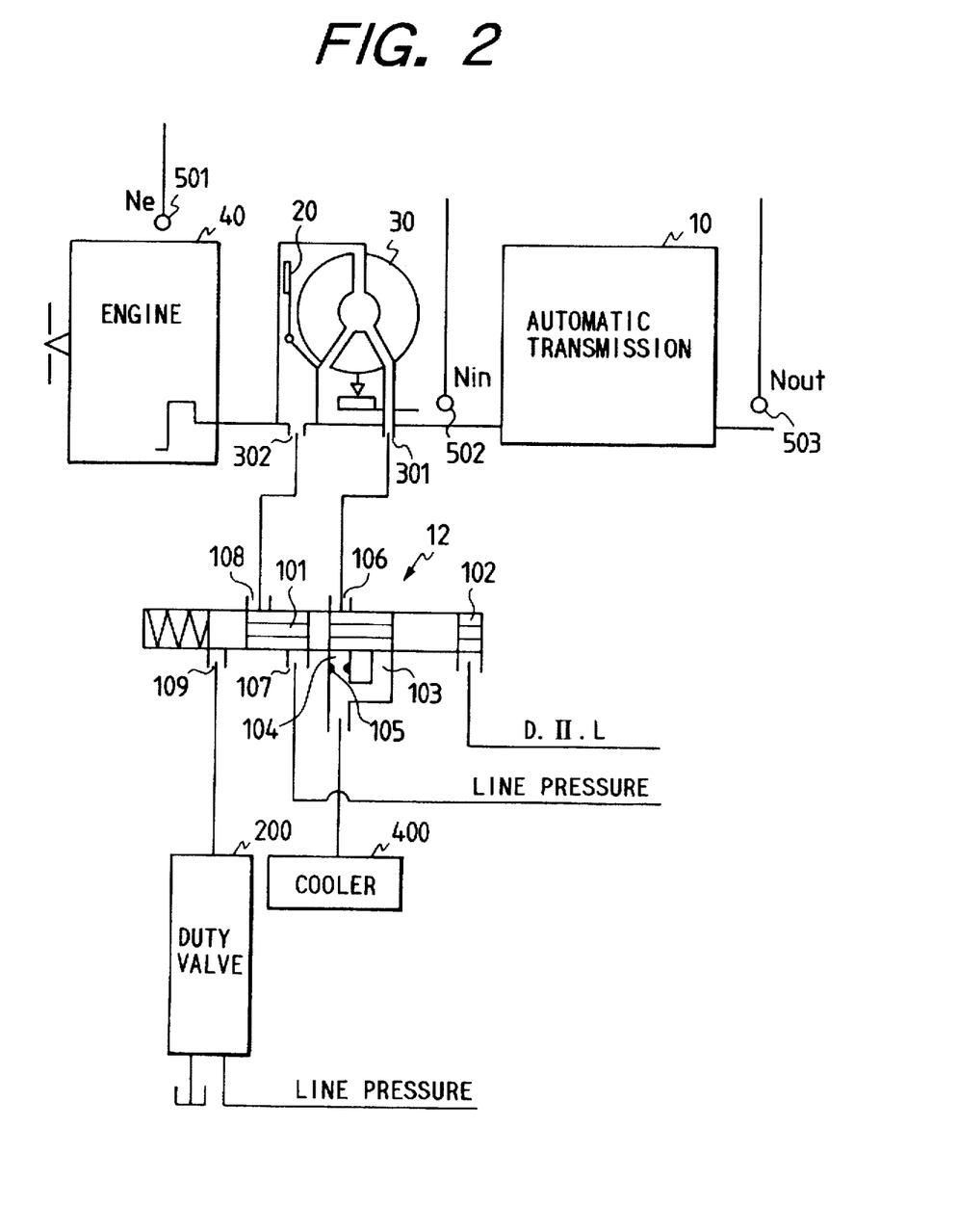
FIG. 2 is a diagram of a portion of the automatic transmission system according to the first embodiment of this invention.

As shown in FIG. 2, a torque converter 30 is connected between the input shaft of the automatic transmission 10 and the output shaft of an automotive engine 40. A lock-up clutch 20 connected to the torque converter 30 serves to mechanically couple and uncouple the input side of the torque converter 30 to and from the output side thereof. The lock-up clutch 20 is changed among a fully or tightly engaged state, a weakly or loosely engaged state (a slip state), and a disengaged state in response to a difference between the pressures in regions at a front side and a rear side thereof. When the lock-up clutch 20 assumes the fully engaged state, the input side and the output side of the torque converter 30 are directly coupled so that the torque converter 30 falls into a lock-up state. When the lock-up clutch 20 assumes the disengaged state, the input side of the torque converter 30 is uncoupled from the output side thereof so that the torque converter 30 moves from the lock-up state to an active state. When the lock-up clutch 20 assumes the loosely engaged state, a slip is allowed to occur between the input side and the output side of the torque converter 30.

As shown in FIG. 2, the mechanical valve arrangement 12 includes a movable valve spool (a movable valve member) 101, a pressure chamber 102, and ports 103, 104, 106, 107, 108, and 109. An orifice or a flow restriction 105 is provided in the port 104. The port 106 of the mechanical valve arrangement 12 is connected to a port 301 of the torque converter 30 at a rear side of the lock-up clutch 20. The port 108 of the mechanical valve arrangement 12 is connected to a port 302 of the torque converter 30 at a front side of the lock-up clutch 20. The port 103 of the mechanical valve arrangement 12 is connected to a cooler (a cooling device) 400. The port 104 of the mechanical valve arrangement 12 is connected to the cooler 400 via the flow restriction 105. The port 107 of the mechanical valve arrangement 12 is subjected to a hydraulic line pressure (the pressure in a hydraulic line at a high pressure side). The port 109 of the mechanical valve arrangement 12 is connected to an output port of a 3-way solenoid valve 200.

Since the solenoid valve 200 is driven by a pulse signal subjected to duty-cycle control, the solenoid valve 200 is referred to as the duty valve 200.

The pressure chamber 102 of the mechanical valve arrangement 12 is defined in a right-hand side of the valve spool 101. The pressure chamber 102 is connected to a "D" port, a "II" port, and an "L" port of a manual valve (not shown) operated in accordance with movement of a shift lever near a vehicle driver's seat. When the shift lever assumes a "D" range position, a "II" range position, or an "L" range position, the pressure chamber 102 receives the hydraulic line pressure via the manual valve. When the shift lever assumes other positions, the pressure chamber 102 communicates with a fluid tank or a fluid reservoir via the manual valve and therefore receives a low pressure.

In the case where the shift lever assumes positions other than the "D" range position, the "II" range position, and the "L" range position, the pressure chamber 102 receives the low pressure so that the valve spool 101 occupies a right-hand position. In this case, hydraulic fluid flows sequentially through the port 107, the port 108, and the port 302 before reaching the region at the front side of the lock-up clutch 20. Then, the hydraulic fluid travels to the region at the rear side of the lock-up clutch 20, and flows sequentially through the port 301, the port 106, the port 103, and the port 104 before reaching the cooler 400. Thus, in this case, the regions at the front side and the rear side of the lock-up clutch 20 are subjected to effective hydraulic pressures so that the lock-up clutch 20 is in the disengaged state providing the cancel (removal) of the lock-up state of the torque converter 30.

In the case where the shift lever assumes the "D" range position, the "II" range position, or the "L" range position, the valve spool 101 occupies a left-hand position and blocks the port 103. In addition, the port 107 is connected to the ports 104 and 106 while the port 109 is connected to the port 108. Accordingly, hydraulic fluid flows sequentially through the port 107, the port 106, and the port 301 before reaching the region at the rear side of the lock-up clutch 20. Thus, the region at the rear side of the lock-up clutch 20 is subjected to an effective hydraulic pressure. Simultaneously, hydraulic fluid flows sequentially through the port 107 and the port 104 before reaching the cooler 400. Further, the output port of the duty valve 200 communicates with the region at the front side of the lock-up clutch 20 via the ports 109, 108, and 302. Accordingly, in this case, when an effective hydraulic pressure is applied to the region at the front side of the lock-up clutch 20 via the duty valve 200, the lock-up clutch 20 is in the disengaged state providing the cancel (removal) of the lock-up state of the torque converter 30. On the other hand, when the region at the front side of the lock-up clutch 20 is released from the effective hydraulic pressure via the duty valve 200, the lock-up clutch 20 is in the fully engaged state providing the lock-up state of the torque converter 30. When a hydraulic pressure intermediate between the effective hydraulic pressure and a null hydraulic pressure (a zero hydraulic pressure) is applied to the front side of the lock-up clutch 20, the lock-up clutch 20 is in the loosely engaged state at which slip control thereof is enabled.

A first input port of the duty valve 200 is subjected to the hydraulic line pressure. A second input port of the duty valve 200 receives a null hydraulic pressure (a zero hydraulic pressure) from the fluid reservoir or the fluid tank. The duty valve 200 is changeable between first and second positions. When the duty valve 200 assumes its first position, the output port of the duty valve 200 is connected to the first input port thereof and is disconnected from the second input port thereof so that the output port of the duty valve 200 receives the hydraulic line pressure. When the duty valve 200 assumes its second position, the output port of the duty valve 200 is connected to the second input port thereof and is disconnected from the first input port thereof so that the output port of the duty valve 200 receives the null hydraulic pressure. The duty valve 200 is periodically changed between its first and second positions by a drive pulse signal having a given frequency. The effective level of the pressure developed at the output port of the duty valve 200 is varied between the null hydraulic pressure and the hydraulic line pressure in response to the duty cycle (the duty factor) of the drive pulse signal. The duty valve 200 in FIG. 2 constitutes the electromagnetic valve 11 in FIG. 1. The drive pulse signal to the duty valve 200 is generated by the electromagnetic valve controller 3 in FIG. 1.

In the case where the lock-up clutch 20 is in the loosely engaged state, the duty cycle (the duty factor) of the drive pulse signal to the duty valve 200 is controlled to generate a target degree of slip in the lock-up clutch 20 according to a known control procedure.

As shown in FIG. 2, an engine speed sensor 501 associated with the automotive engine 40 outputs a signal representing the rotational engine speed Ne (that is, the rotational speed of the output shaft of the automotive engine 40). The engine speed signal is transmitted to the electromagnetic valve controller 3 in FIG. 1. An input-shaft speed sensor 502 associated with the input shaft of the automatic transmission 10 generates a signal representing the rotational speed Nin of the input shaft of the automatic transmission 10. The input-shaft speed signal is transmitted to the electromagnetic valve controller 3 in FIG. 1. An output-shaft speed sensor 503 associated with the output shaft of the automatic transmission 10 generates a signal representing the rotational speed Nout of the output shaft of the automatic transmission 10. The output-shaft speed signal is transmitted to the electromagnetic valve controller 3 in FIG. 1.

Figure 3:
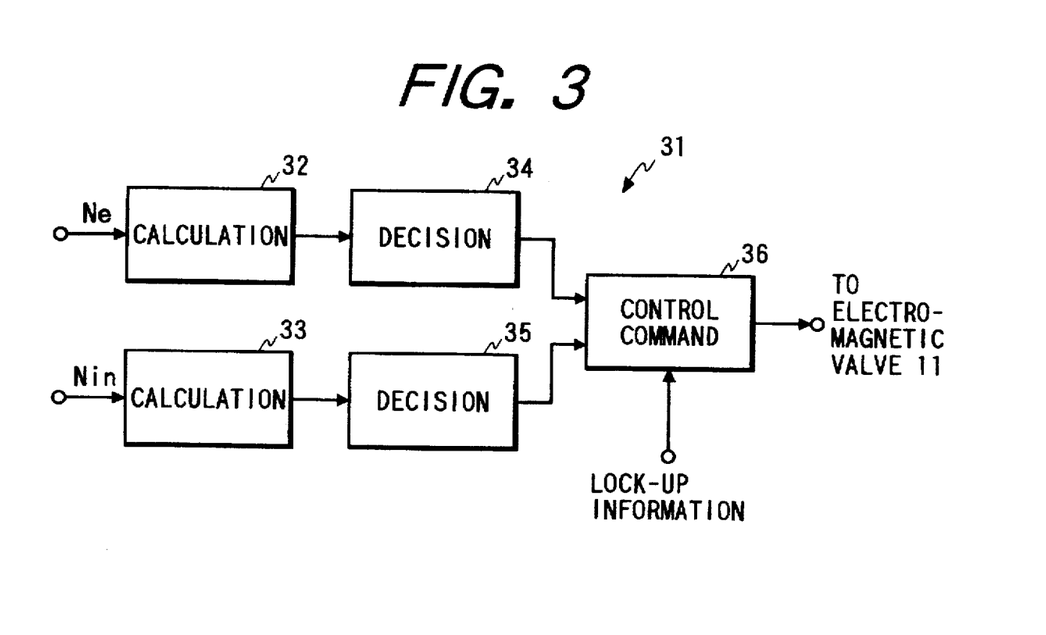
FIG. 3 is a function flow diagram of a lock-up controller in the automatic transmission system of FIG. 1.

FIG. 3 is a function flow diagram of the lock-up controller 31 in the electromagnetic valve controller 3 of FIG. 1. It should be noted that FIG. 3 does not show the hardware of the electromagnetic valve controller 3. In FIG. 3, a block 32 calculates the rate of a time-domain variation in the engine speed Ne. A block 33 calculates the rate of a measure of time-domain variation in the input-shaft speed Nin. A block 34 following the block 32 decides whether or not the calculated measure of time-domain variation in the engine speed Ne exceeds a predetermined threshold value corresponding to the criterion or boundary between the presence and the absence of an effective torque change. A block 35 following the block 33 decides whether or not the calculated measure of time-domain variation in the input-shaft speed Nin exceeds a predetermined threshold value corresponding to the criterion or boundary between the presence and the absence of an effective torque change. A block 36 following the blocks 34 and 35 responds to the results of the decisions by the blocks 34 and 35 and also to lock-up information which represents whether the lock-up clutch 20 is in the fully engaged state (the lock-up state), the loosely engaged state (the slip control state), or the disengaged state (the lock-up canceled state). In the case where the lock-up clutch 20 is in the fully engaged state, the block 36 generates a control command signal for changing the lock-up clutch 20 from the fully engaged state to the loosely engaged state when the results of the decisions by the blocks 34 and 35 fall into given conditions. In the case where the lock-up clutch 20 is in the loosely engaged state, the block 36 generates a control command signal for changing the lock-up clutch 20 from the loosely engaged state to the disengaged state when the results of the decisions by the blocks 34 and 35 fall into given conditions. The generated control command signal is outputted to the electromagnetic valve 11 in FIG. 1.

Figure 4:
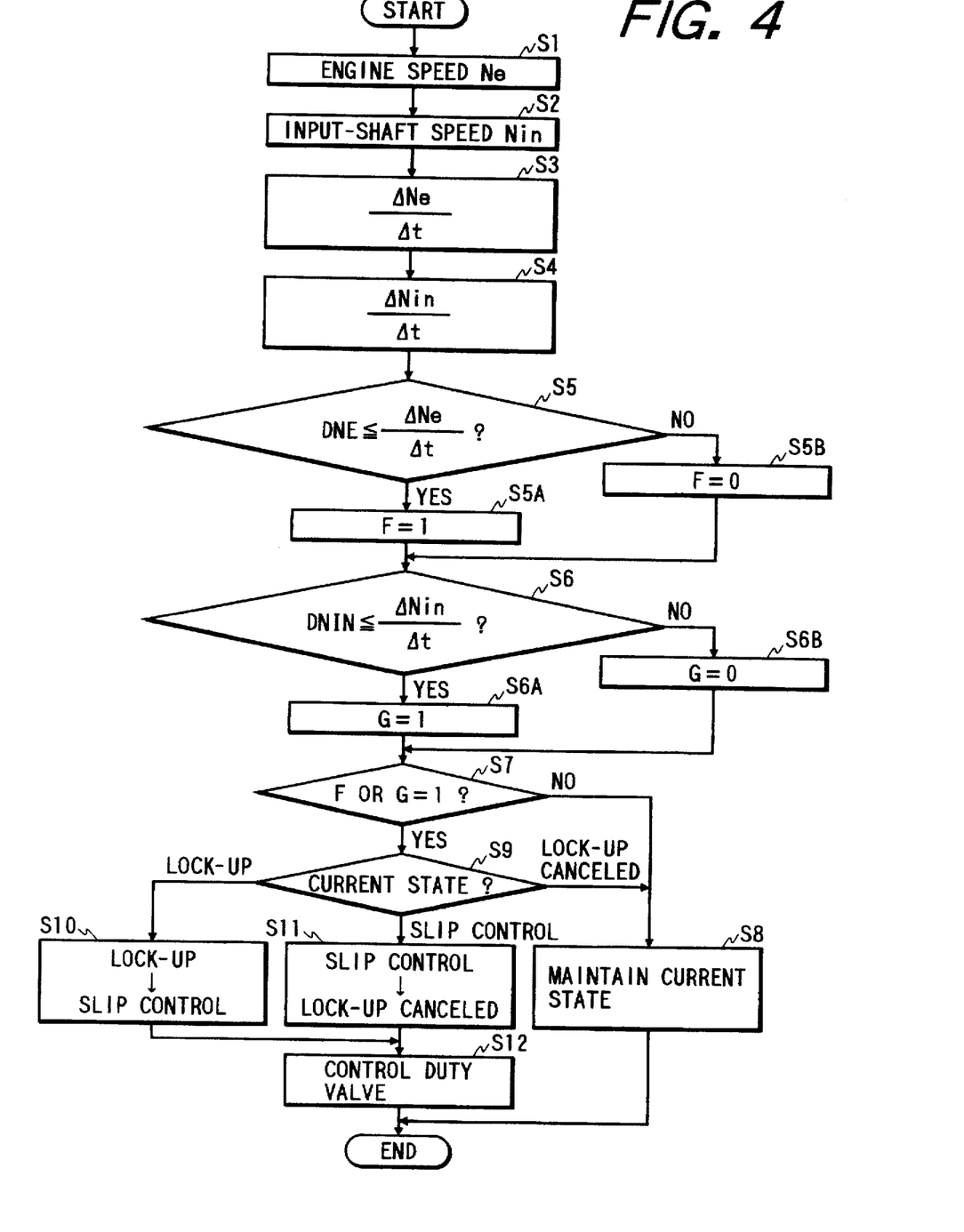
FIG. 4 is a flowchart of a segment of a program for controlling operation of an electromagnetic valve controller in the automatic transmission system of FIG. 1.

As previously described, the electromagnetic valve controller 3 operates in accordance with a program stored in the internal ROM. FIG. 4 is a flowchart of a segment of the program which corresponds to the lock-up controller 31. This program segment is periodically reiterated.

As shown in FIG. 4, a first step S1 of the program segment derives the current value of the engine speed Ne from the engine speed signal. A step S2 following the step S1 derives the current value of the input-shaft speed Nin from the input-shaft speed signal.

A step S3 following the step S2 calculates the rate of a time-domain variation in the engine speed Ne from the current and previous values thereof. The calculated rate of the time-domain variation in the engine speed Ne is denoted as "$\Delta Ne/\Delta t$".

A step S4 following the step S3 calculates the measure of time-domain variation in the input-shaft speed Nin from the current and previous values thereof. The calculated measure of time-domain variation in the input-shaft speed Nin is denoted as "$\Delta Nin/\Delta t$".

A step S5 subsequent to the step S4 compares the calculated rate "$\Delta Ne/\Delta t$" with a given threshold value DNE corresponding to the criterion or boundary between the presence and the absence of an effective torque change. When the calculated measure "$\Delta Ne/\Delta t$" is equal to or greater than the threshold value DNE, the program advances from the step S5 to a step S5A. Otherwise, the program advances from the step S5 to a step S5B.

The step S5A sets a flag F to "1". On the other hand, the step S5B sets the flag F to "0". After the steps S5A and S5B, the program advances to a step S6.

The step S6 compares the calculated measure "$\Delta Nin/\Delta t$" with a given threshold value DNIN corresponding to the criterion or boundary between the presence and the absence of an effective torque change. When the calculated measure "$\Delta Nin/\Delta t$" is equal to or greater than the threshold value DNIN, the program advances from the step S6 to a step S6A. Otherwise, the program advances from the step S6 to a step S6B.

The step S6A sets a flag G to "1". On the other hand, the step S6B sets the flag G to "0". After the steps S6A and S6B, the program advances to a step S7.

The step S7 decides whether or not at least one of the flags F and G is "1". When at least one of the flags F and G is "1", the program advances from the step S7 to a step S9. When both the flags F and G are "0", the program advances from the step S7 to a step S8.

The step S8 controls the duty valve 200 (the electromagnetic valve 11) so that the torque converter 20 will continue to be in the current state. After the step S8, the present execution cycle of the program segment ends.

The step S9 detects the current state of the torque converter 20 by referring to information determining the drive pulse signal to the duty valve 200 (the electromagnetic valve 11). Specifically, the step S9 determines whether the torque converter 20 is currently in the fully engaged state (the lock-up state), the loosely engaged state (the slip control state), or the disengaged state (the lock-up canceled state). When the torque converter 20 is currently in the fully engaged state (the lock-up state), the program advances from the step S9 to a step S10. When the torque converter 20 is currently in the loosely engaged state (the slip control state), the program advances from the step S9 to a step S11. When the torque converter 20 is currently in the disengaged state (the lock-up canceled state), the program advances from the step S9 to the step S8.

The step S10 sets a command flag (a command signal) to a state corresponding to a command of changing the torque converter 20 from the fully engaged state (the lock-up state) to the loosely engaged state (the slip control state). After the step S10, the program advances to a step S12.

The step S11 sets the command flag (the command signal) to a state corresponding to a command of changing the torque converter 20 from the loosely engaged state (the slip control state) to the disengaged state (the lock-up canceled state). After the step S11, the program advances to the step S12.

The step S12 controls the duty valve 200 (the electromagnetic valve 11) in response to the command flag so that the torque converter 20 will change to the state according to the command flag. Specifically, the torque converter 20 will change from the fully engaged state (the lock-up state) to the loosely engaged state (the slip control state), or from the loosely engaged state (the slip control state) to the disengaged state (the lock-up canceled state). After the step S12, the present execution cycle of the program segment ends.

The change of the torque converter 20 to the loosely engaged state (the slip control state) or the disengaged state (the lock-up canceled state) suppresses a shock and an uncomfortable torque variation.

Figure 5A:
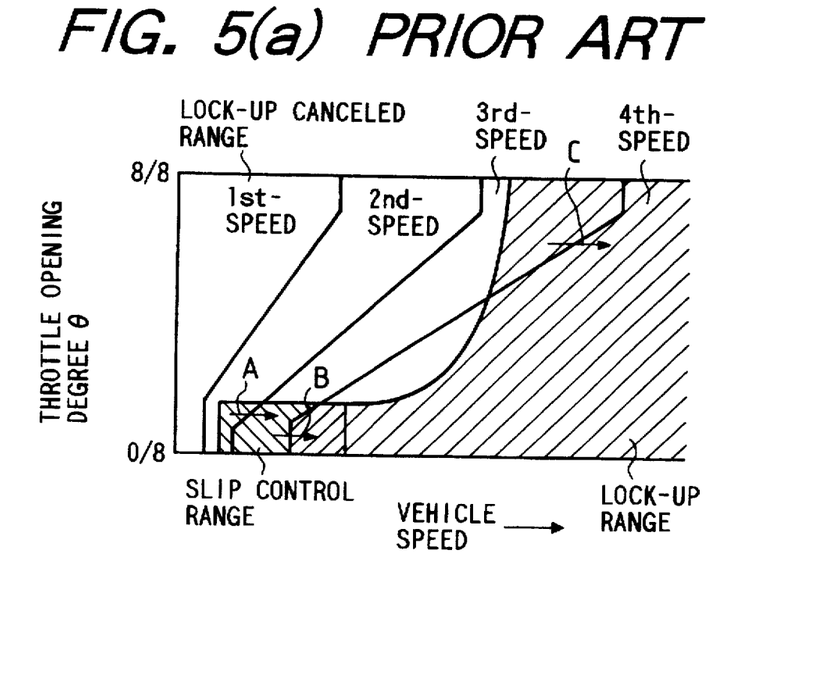
FIG. 5(a) is a diagram of a prior-art gear shift map.
Figure 5B:
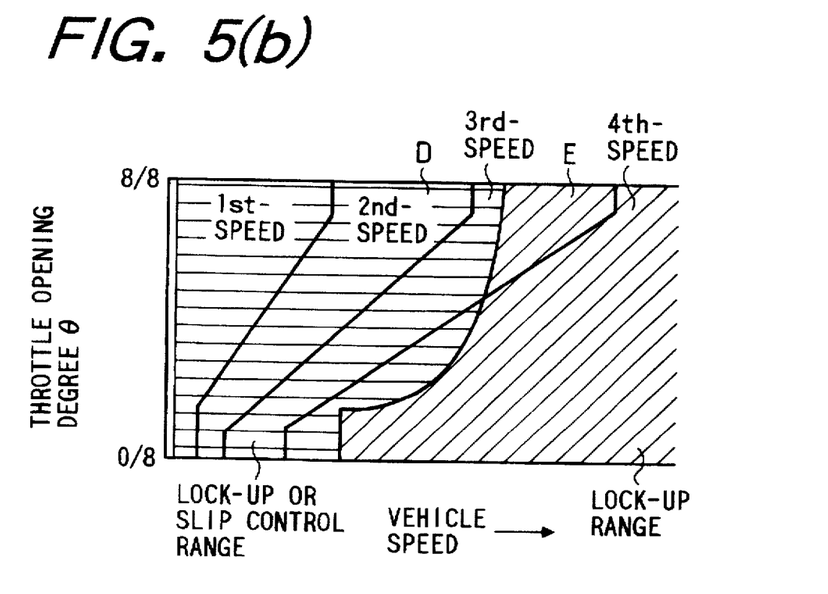
FIG. 5(b) is a diagram of a gear shift map in the automatic transmission system of FIG. 1.

Gear shift points are given according to a two-dimensional map (table) determined by the vehicle speed signal and the throttle opening degree signal (the throttle position signal) which is divided into eight ranges. FIG. 5(a) shows a prior-art gear shift map. In FIG. 5(a), the hatched region C corresponds to the execution of lock up while the hatched regions B and C correspond to the execution of slip control. FIG. 5(b) shows a gear shift map in the embodiment of this invention. In FIG. 5(b), the hatched region E corresponds to the execution of lock up while the hatched region D corresponds to the execution of slip control or lock up. It is understood from the comparison between FIG. 5(a) and FIG. 5(b) that the lock-up execution range and the slip-control execution range in the embodiment of this invention are wider than those in the prior-art design.

Second Embodiment

Figure 6:
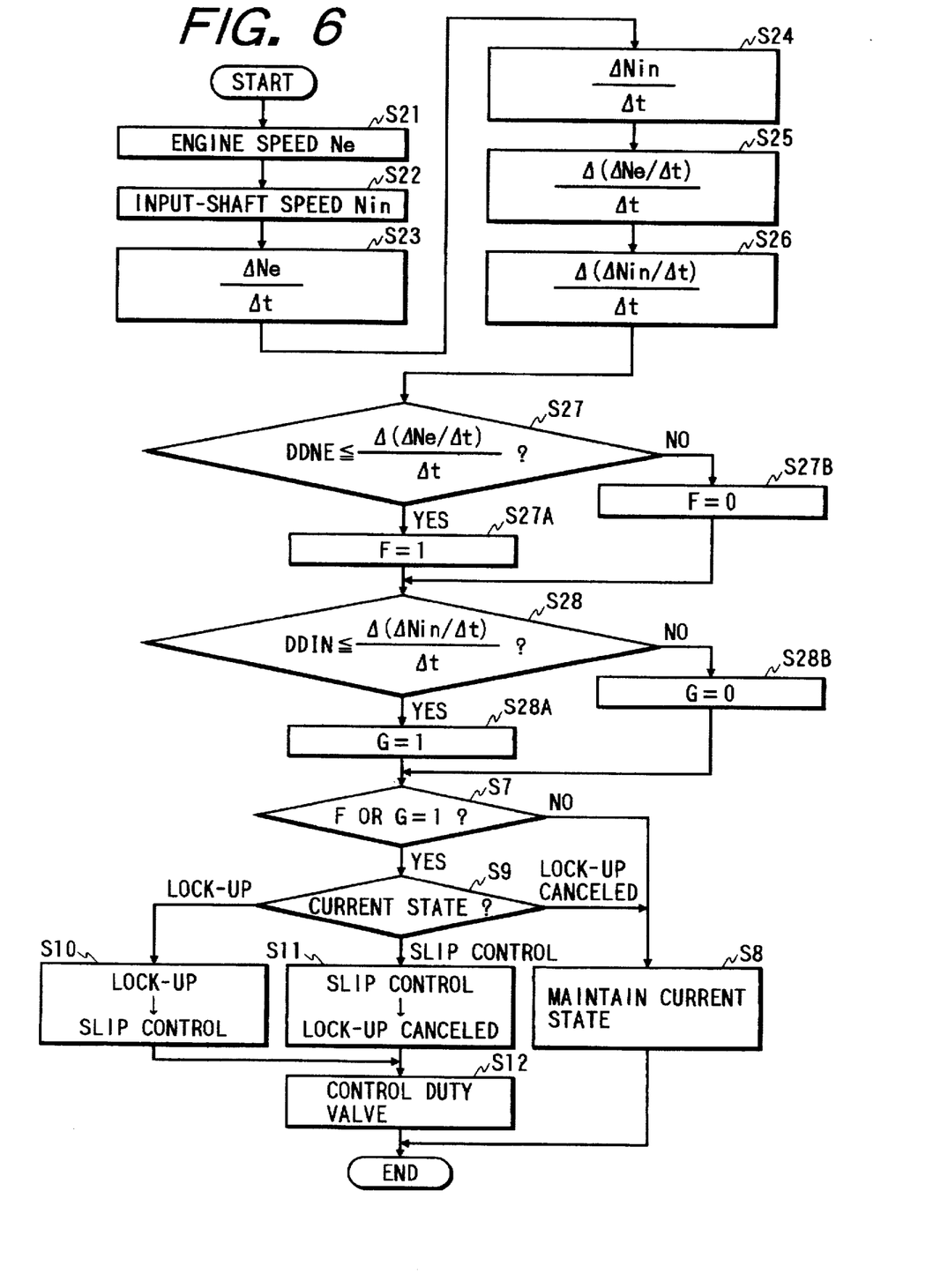
FIG. 6 is a flowchart of a segment of a program for controlling operation of an electromagnetic valve controller in an automatic transmission system according to a second embodiment of this invention.

A second embodiment of this invention is similar to the first embodiment thereof except for design changes described hereinafter. FIG. 6 is a flowchart of a segment of a program in the second embodiment of this invention which is a modification of the program segment of FIG. 4.

As shown in FIG. 6, a first step S21 of the program segment derives the current value of the engine speed Ne from the engine speed signal. A step S22 following the step S21 derives the current value of the input-shaft speed Nin from the input-shaft speed signal.

A step S23 following the step S22 calculates a first-order differential of the engine speed Ne with respect to time on the basis of the current and previous values thereof. The calculated first-order differential of the engine speed Ne is denoted as "$\Delta Ne/\Delta t$".

A step S24 following the step S23 calculates a first-order differential of the input-shaft speed Nin with respect to time on the basis of the current and previous values thereof. The calculated first-order differential of the input-shaft speed Nin is denoted as "$\Delta Nin/\Delta t$".

A step S25 following the step S24 calculates a second-order differential of the engine speed Ne with respect to time on the basis of the current and previous values of the first-order differential thereof. The calculated second-order differential of the engine speed Ne is denoted as "$\{\Delta(\Delta Ne/\Delta t)\}/\Delta t$".

A step S26 following the step S25 calculates a second-order differential of the input-shaft speed Nin with respect to time on the basis of the current and previous values of the first-order differential thereof. The calculated second-order differential of the input-shaft speed Nin is denoted as "$\{\Delta(\Delta Nin/\Delta t)\}/\Delta t$".

A step S27 subsequent to the step S26 compares the calculated second-order differential "$\{\Delta(\Delta Ne/\Delta t)\}/\Delta t$" with a given threshold value DDNE corresponding to the criterion or boundary between the presence and the absence of an effective torque change. When the calculated second-order differential "$\{\Delta(\Delta Ne/\Delta t)\}/\Delta t$" is equal to or greater than the threshold value DDNE, the program advances from the step S27 to a step S27A. Otherwise, the program advances from the step S27 to a step S27B.

The step S27A sets a flag F to "1". On the other hand, the step S27B sets the flag F to "0". After the steps S27A and S27B, the program advances to a step S28.

The step S28 compares the second-order differential "$\{\Delta(\Delta Nin/\Delta t)\}/\Delta t$" with a given threshold value DDNIN corresponding to the criterion or boundary between the presence and the absence of an effective torque change. When the calculated second-order differential "$\{\Delta(\Delta Nin/\Delta t)\}/\Delta t$" is equal to or greater than the threshold value DDNIN, the program advances from the step S28 to a step S28A. Otherwise, the program advances from the step S28 to a step S28B.

The step S28A sets a flag G to "1". On the other hand, the step S28B sets the flag G to "0". After the steps S28A and S28B, the program advances to a step S7 (see FIG. 4).

Third Embodiment

A third embodiment of this invention is similar to the first embodiment thereof except for design changes described hereinafter. The second embodiment of this invention includes a lock-up controller 31A which replaces the lock-up controller 31 in FIGS. 1 and 3.

Figure 7:
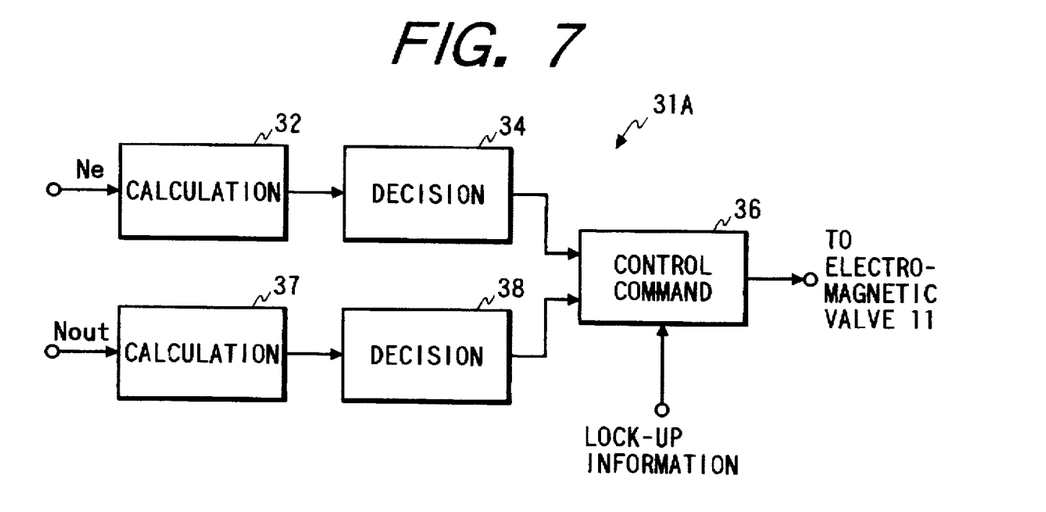
FIG. 7 is a function flow diagram of a lock-up controller in an automatic transmission system according to a third embodiment of this invention.

FIG. 7 is a function flow diagram of the lock-up controller 31A. It should be noted that FIG. 7 does not show the hardware related to the lock-up controller 31A. In FIG. 7, a block 32 calculates the measure of time-domain variation in the engine speed Ne. A block 37 calculates the measure of time-domain variation in the output-shaft speed Nout. A block 34 following the block 32 decides whether or not the calculated measure of time-domain variation in the engine speed Ne exceeds a predetermined threshold value corresponding to the criterion or boundary between the presence and the absence of an effective torque change. A block 38 following the block 37 decides whether or not the calculated measure of time-domain variation in the output-shaft speed Nout exceeds a predetermined threshold value corresponding to the criterion or boundary between the presence and the absence of an effective torque change. A block 36 following the blocks 34 and 38 responds to the results of the decisions by the blocks 34 and 38 and also to lock-up information which represents whether a lock-up clutch 20 is in the fully engaged state (the lock-up state), the loosely engaged state (the slip control state), or the disengaged state (the lock-up canceled state). In the case where the lock-up clutch 20 is in the fully engaged state, the block 36 generates a control command signal for changing the lock-up clutch 20 from the fully engaged state to the loosely engaged state when the results of the decisions by the blocks 34 and 38 fall into given conditions. In the case where the lock-up clutch 20 is in the loosely engaged state, the block 36 generates a control command signal for changing the lock-up clutch 20 from the loosely engaged state to the disengaged state when the results of the decisions by the blocks 34 and 38 fall into given conditions. The generated control command signal is outputted to an electromagnetic valve 11 (see FIG. 1).

Fourth Embodiment

Figure 8:
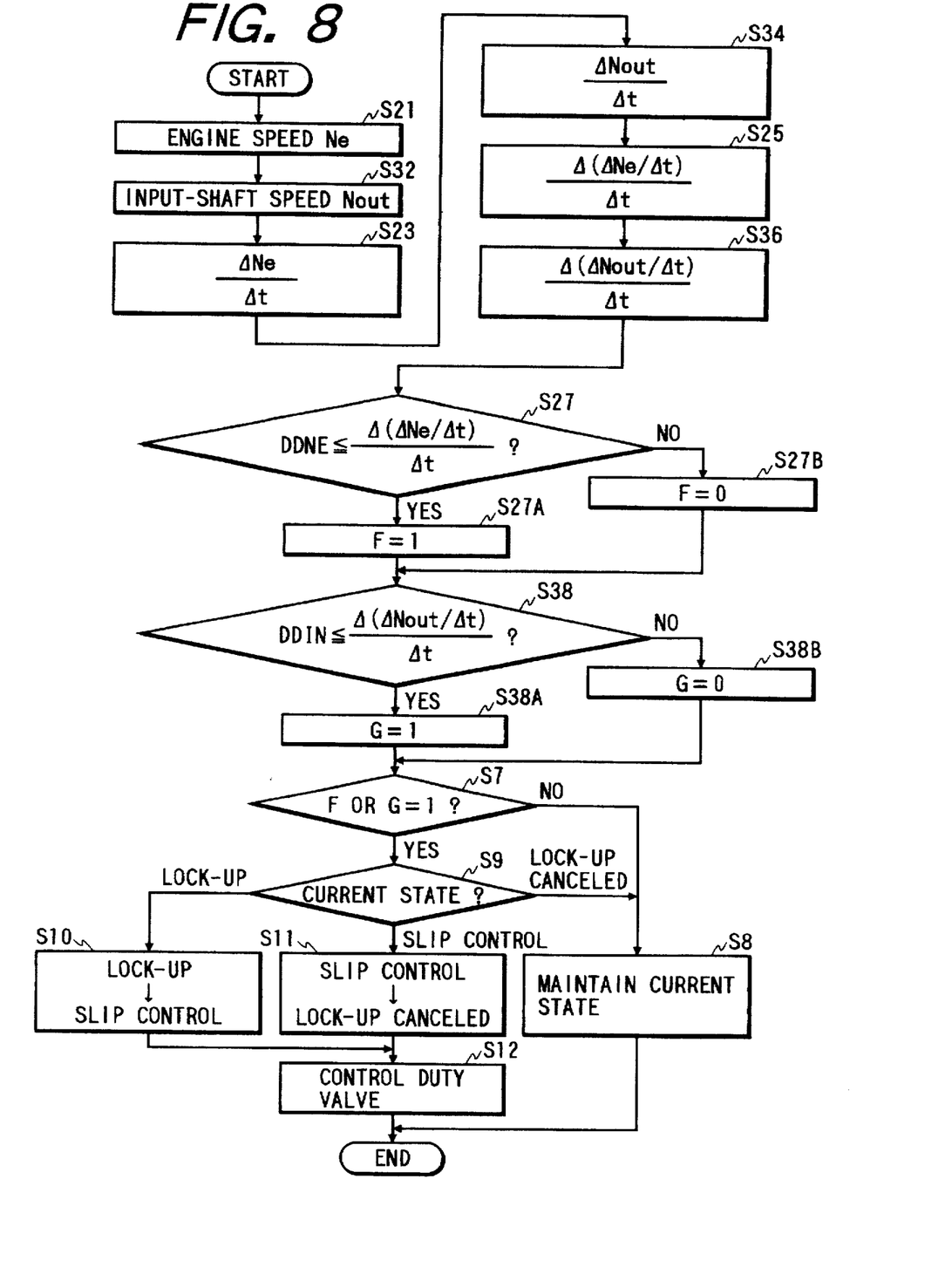
FIG. 8 is a flowchart of a segment of a program for controlling operation of an electromagnetic valve controller in an automatic transmission system according to a fourth embodiment of this invention.

A fourth embodiment of this invention is similar to the second embodiment thereof except for design changes described hereinafter. FIG. 8 is a flowchart of a segment of a program in the fourth embodiment of this invention which is a modification of the program segment of FIG. 6.

As shown in FIG. 8, a first step S21 of the program segment derives the current value of the engine speed Ne from the engine speed signal. A step S32 following the step S21 derives the current value of the output-shaft speed Nout from the output-shaft speed signal.

A step S23 following the step S32 calculates a first-order differential of the engine speed Ne with respect to time on the basis of the current and previous values thereof. The calculated first-order differential of the engine speed Ne is denoted as "$\Delta Ne/\Delta t$".

A step S34 following the step S23 calculates a first-order differential of the output-shaft speed Nout with respect to time on the basis of the current and previous values thereof. The calculated first-order differential of the output-shaft speed Nout is denoted as "ΔNout/Δt".

A step S25 following the step S34 calculates a second-order differential of the engine speed Ne with respect to time on the basis of the current and previous values of the first-order differential thereof. The calculated second-order differential of the engine speed Ne is denoted as "{Δ(ΔNe/Δt)}/Δt".

A step S36 following the step S25 calculates a second-order differential of the output-shaft speed Nout with respect to time on the basis of the current and previous values of the first-order differential thereof. The calculated second-order differential of the output-shaft speed Nout is denoted as "{Δ(ΔNout/Δt)}/Δt".

A step S27 subsequent to the step S36 compares the calculated second-order differential "{Δ(ΔNe/Δt)}/Δt" with a given threshold value DDNE corresponding to the criterion or boundary between the presence and the absence of an effective torque change. When the calculated second-order differential "{Δ(ΔNe/Δt)}/Δt" is equal to or greater than the threshold value DDNE, the program advances from the step S27 to a step S27A. Otherwise, the program advances from the step S27 to a step S27B.

The step S27A sets a flag F to "1". On the other hand, the step S27B sets the flag F to "0". After the steps S27A and S27B, the program advances to a step S38.

The step S38 compares the second-order differential "{Δ(ΔNout/Δt)}/Δt" with a given threshold value DDNOUT corresponding to the criterion or boundary between the presence and the absence of an effective torque change. When the calculated second-order differential "{Δ(ΔNout/Δt)}/Δt" is equal to or greater than the threshold value DDNOUT, the program advances from the step S38 to a step S38A. Otherwise, the program advances from the step S38 to a step S38B.

The step S38A sets a flag G to "1". On the other hand, the step S38B sets the flag G to "0". After the steps S38A and S38B, the program advances to a step S7 (see FIG. 4).

Fifth Embodiment

A fifth embodiment of this invention Is similar to the first embodiment thereof except that the fifth embodiment of this invention includes an additional arrangement described hereinafter. The fifth embodiment of this invention includes a lock-up controller 31B which replaces the lock-up controller 31 in FIGS. 1 and 3.

Figure 9:
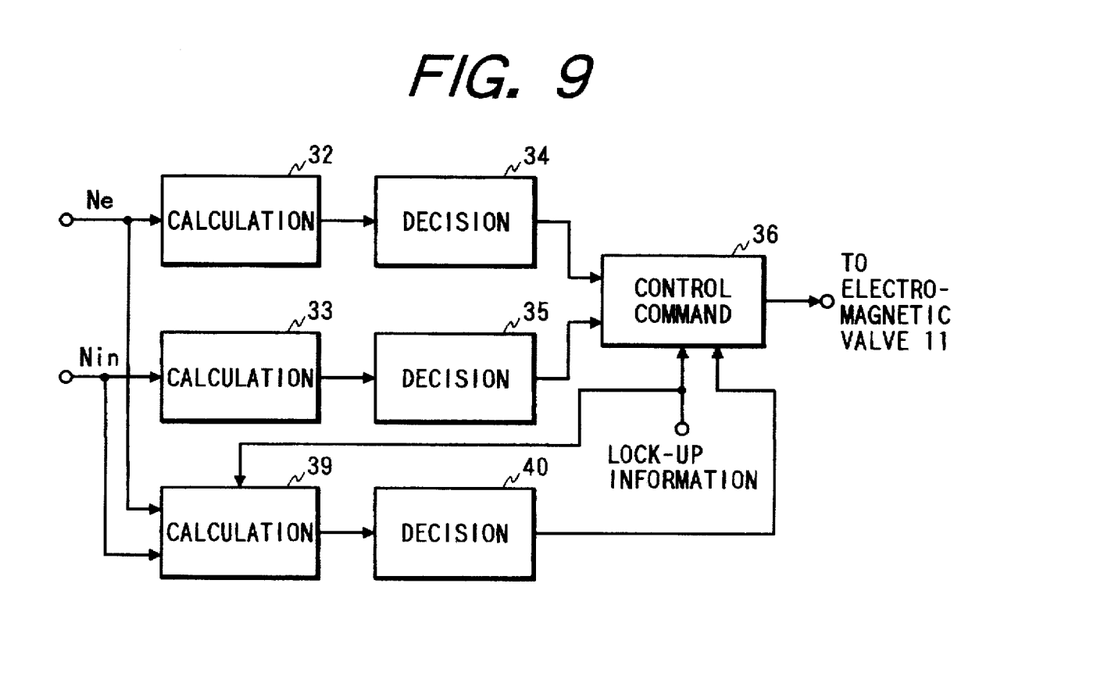
FIG. 9 is a function flow diagram of a lock-up controller in an automatic transmission system according to a fifth embodiment of this invention.

FIG. 9 is a function flow diagram of the lock-up controller 31B. It should be noted that FIG. 9 does not show the hardware related to the lock-up controller 31B. In FIG. 9, a block 39 calculates the difference between the engine speed Ne and the input-shaft speed Nin. Further, the block 39 calculates a second-order differential of the difference between the engine speed Ne and the input-shaft speed Nin with respect to time. A block 40 following the block 39 decides whether or not the calculated second-order differential of the difference between the engine speed Ne and the input-shaft speed Nin exceeds a predetermined threshold value corresponding to the criterion or boundary between the presence and the absence of an effective torque change. A block 36 following the block 40 responds to the result of the decision by the block 40. In the case where a lock-up clutch 20 is in a loosely engaged state (a slip control state), the block 36 generates a control command signal for changing the lock-up clutch 20 from the loosely engaged state (the slip control state) to a disengaged state (a lock-up canceled state) when the result of the decision by the block 40 represents that the calculated second-order differential exceeds the threshold value. The generated control command signal is outputted to an electromagnetic valve 11 (see FIG. 1).

Figure 10:
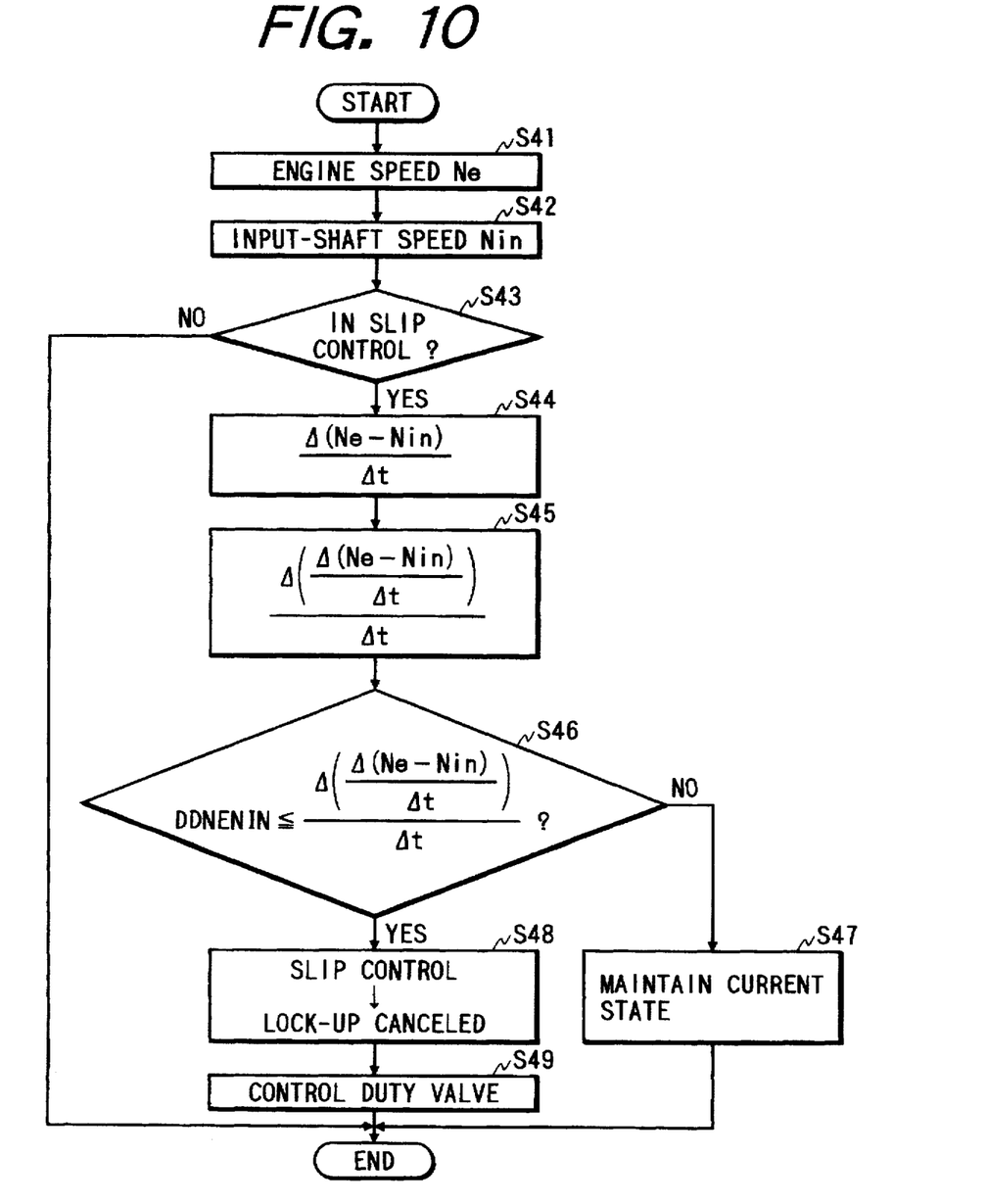
FIG. 10 is a flowchart of a segment of a program for controlling operation of an electromagnetic valve controller in the automatic transmission system according to the fifth embodiment of this invention.

As previously described, an electromagnetic valve controller 3 (see FIG. 1) operates in accordance with a program stored in an internal ROM. FIG. 10 is a flowchart of a segment of the program which is periodically reiterated. It should be noted that the program segment of FIG. 10 and the program segment of FIG. 4 may be executed in a common routine.

As shown in FIG. 10, a first step S41 of the program segment derives the current value of the engine speed Ne from the engine speed signal. A step S42 following the step S41 derives the current value of the input-shaft speed Nin from the input-shaft speed signal.

A step S43 following the step S42 detects the current state of a torque converter 20 by referring to information determining a drive pulse signal to a duty valve 200 (an electromagnetic valve 11). Further, the step S43 determines whether or not the torque converter 20 is currently in the loosely engaged state (the slip control state), that is, whether or not the slip control is currently executed. When the torque converter 20 is currently in the loosely engaged state (the slip control state), that is, when the slip control is currently executed, the program advances from the step S43 to a step S44. Otherwise, the program exits from the step S43 and then the present execution cycle of the program segment ends.

The step S44 calculates the difference "Ne–Nin" between the current engine speed Ne and the current input-shaft speed Nin. Further, the step S44 calculates a first-order differential of the speed difference "Ne–Nin" with respect to time. The calculated first-order differential of the speed difference "Ne–Nin" is denoted as "Δ(Ne–Nin)/Δt".

A step S45 following the step S44 calculates a second-order differential of the speed difference "Ne–Nin" with respect to time on the basis of the current and previous values of the calculated first-order differential thereof. The calculated second-order differential of the speed difference "Ne–Nin" is denoted as "{Δ(Δ(Ne–Nin)/Δt)}/Δt".

A step S46 following the step S45 compares the calculated second-order differential "{Δ(Δ(Ne–Nin)/Δt)}/Δt" with a given threshold value DDNENIN corresponding to the criterioh or boundary between the presence and the absence of an effective torque change. When the calculated second-order differential "{Δ(Δ(Ne–Nin)/Δt)}/Δt" is equal to or greater than the threshold value DDNENIN, the program advances from the step S46 to a step S48. Otherwise, the program advances from the step S46 to a step S47.

The step S47 controls the duty valve 200 (the electromagnetic valve 11) so that the torque converter 20 will continue to be in the current state. Thus, the slip control will continue. After the step S47, the present execution cycle of the program segment ends.

The step S48 sets a command flag (a command signal) to a state corresponding to a command of changing the torque converter 20 from the loosely engaged state (the slip control state) to the disengaged state (the lock-up canceled state). After the step S48, the program advances to a step 49.

The step S49 controls the duty valve 200 (the electromagnetic valve 11) in response to the command flag so that the torque converter 20 will change to the state according to the command flag. Specifically, the torque converter 20 will change from the loosely engaged state (the slip control state) to the disengaged state (the lock-up canceled state). Thus, the slip control will be interrupted. After the step S49, the present execution cycle of the program segment ends.

Figure 11:
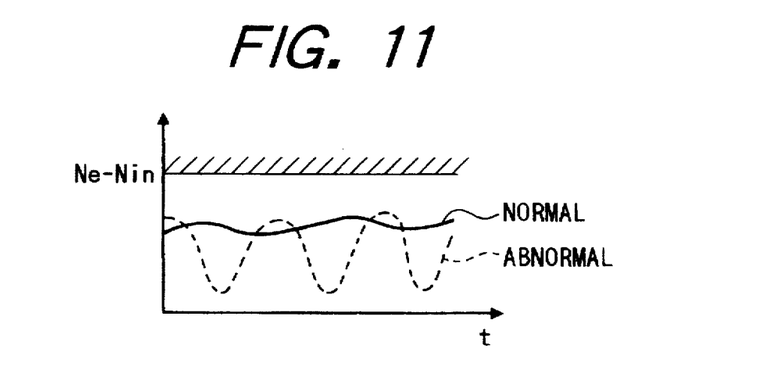
FIG. 11 is a time-domain diagram of a difference between an engine speed and an input-shaft speed which occurs during the execution of slip control.

During the execution of the slip control, the duty valve 200 (the electromagnetic valve 11) is controlled so that the speed difference "Ne–Nin" can remain in a given range as shown in FIG. 11. Under given conditions, even when the slip control remains executed, the speed difference "Ne–Nin" tends to considerably move up and down as denoted by the broken curve in FIG. 11. Accordingly, under such conditions, the second-order differential of the speed difference "Ne–Nin" can exceed the threshold value.

Sixth Embodiment

Figure 12:
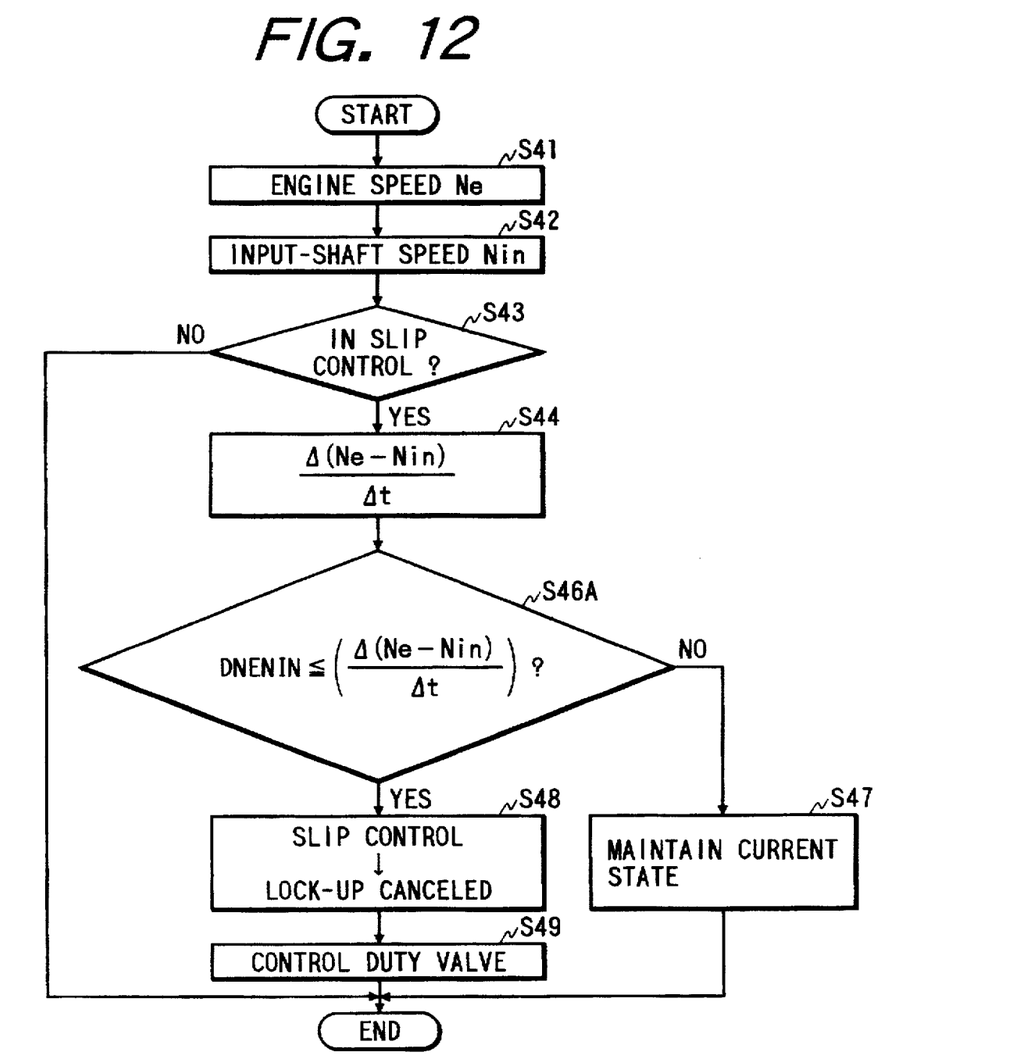
FIG. 12 is a flowchart of a segment of a program for controlling operation of an electromagnetic valve controller in an automatic transmission system according to a sixth embodiment of this invention.

A sixth embodiment of this invention is similar to the fifth embodiment thereof except for design changes described hereinafter. FIG. 12 is a flowchart of a segment of a program in the sixth embodiment of this invention which is a modification of the program segment of FIG. 10.

In the program segment of FIG. 12, a step S44 is followed by a step S46A. The step S46A compares a calculated first-order differential "Δ(Ne–Nin)/Δt" with a given threshold value DNENIN corresponding to the criterion or boundary between the presence and the absence of an effective torque change. When the calculated first-order differential "Δ(Ne–Nin)/Δt" is equal to or greater than the threshold value DNENIN, the program advances from the step S46A to a step S48. Otherwise, the program advances from the step S46A to a step S47.

What is claimed is:

1. An automatic transmission system with a lock-up clutch and for use with an engine, comprising:

an automatic transmission having an input shaft;

a torque converter with a lock-up clutch, which is provided between the input shaft of the automatic transmission and an output shaft of the engine;

first means for calculating a measure of time-domain variation in a rotational speed of the output shaft of the engine;

second means connected to the first means, for deciding whether or not the measure of time-domain variation in the rotational speed of the output shaft of the engine, which is calculated by the first means, exceeds a predetermined threshold value representing a torque variation;

third means connected to the lock-up clutch for deciding whether the lock-up clutch is in a lock-up state or a slip control state;

fourth means connected to the lock-up clutch, the second means, and the third means, for changing the lock-up clutch to the slip control state in cases where the second means decides that the measure of time-domain variation in the rotational speed of the output shaft of the engine exceeds the predetermined threshold value and the third means decides that the lock-up clutch is in the lock-up state; and fifth means connected to the lock-up clutch, the second means, and the third means, for changing the lock-up clutch to a released state in cases where the second means decides that the measure of time-domain variation in the rotational speed of the output shaft of the engine exceeds the predetermined threshold value and the third means decides that the lock-up clutch is in the slip control state.

2. An automatic transmission system according to claim 1, wherein the first means comprises means for calculating a second-order differential of the rotational speed of the output shaft of the engine with respect to time.

3. An automatic transmission system with a lock-up clutch and for use with an engine, comprising:

an automatic transmission having an input shaft;

a torque converter with a lock-up clutch, which is provided between the input shaft of the automatic transmission and an output shaft of the engine;

first means for calculating a measure of time-domain variation in a rotational speed of the input shaft of the automatic transmission;

second means connected to the first means for deciding whether or not the measure of time-domain variation in the rotational speed of the input shaft of the automatic transmission, which is calculated by the first means, exceeds a predetermined threshold value representing a torque variation;

third means connected to the lock-up clutch, for deciding whether the lock-up clutch is in a lock-up state or a slip control state;

fourth means connected to the lock-up clutch, the second means, and the third means, for changing the lock-up clutch to the slip control state in cases where the second means decides that the measure of time-domain variation in the rotational speed of the input shaft of the automatic transmission exceeds the predetermined threshold value and the third means decides that the lock-up clutch is in the lock-up state; and fifth means connected to the lock-up clutch, the second means, and the third means, for changing the lock-up clutch to a released state in cases where the second means decides that the measure of time-domain variation in the rotational speed of the input shaft of the automatic transmission exceeds the predetermined threshold value and the third means decides that the lock-up clutch is in the slip control state.

4. An automatic transmission system according to claim 3, wherein the first means comprises means for calculating a second-order differential of the rotational speed of the input shaft of the automatic transmission with respect to time.

5. An automatic transmission system with a lock-up clutch and for use with an engine, comprising:

an automatic transmission having an input shaft and an output shaft;

a torque converter with a lock-up clutch, which is provided between the input shaft of the automatic transmission and an output shaft of the engine;

first means for calculating a measure of time-domain variation in a rotational speed of the output shaft of the automatic transmission;

second means connected to the first means, for deciding whether or not the measure of time-domain variation in the rotational speed of the output shaft of the automatic transmission, which is calculated by the first means, exceeds a predetermined threshold value representing a torque variation;

third means connected to the lock-up clutch, for deciding whether the lock-up clutch is in a lock-up state or a slip control state;

fourth means connected to the lock-up clutch, the second means, and the third means, for changing the lock-up clutch to the slip control state in cases where the second means decides that the measure of time-domain variation in the rotational speed of the output shaft of the automatic transmission exceeds the predetermined threshold value and the third means decides that the lock-up clutch is in the lock-up state; and fifth means connected to the lock-up clutch, the second means, and the third means, for changing the lock-up clutch to a released state in cases where the second means decides that the measure of time-domain variation in the rotational speed of the output shaft of the automatic transmission exceeds the predetermined threshold value and the third means decides that the lock-up clutch is in the slip control state.

6. An automatic transmission system according to claim 5, wherein the first means comprises means for calculating a second-order differential of the rotational speed of the output shaft of the automatic transmission with respect to time.

7. An automatic transmission system with a lock-up clutch and for use with an engine, comprising:

an automatic transmission having an input shaft;

a torque converter with a lock-up clutch, which is provided between the input shaft of the automatic transmission and an output shaft of the engine;

first means for calculating a measure of time-domain variation in a rotational speed of the output shaft of the engine;

second means for calculating a measure of time-domain variation in a rotational speed of the input shaft of the automatic transmission;

third means connected to the first means, for deciding whether or not the measure of time-domain variation in the rotational speed of the output shaft of the engine, which is calculated by the first means, exceeds a first predetermined threshold value representing a torque variation;

fourth means connected to the second means for deciding whether or not the measure of time-domain variation in the rotation speed of the input shaft of the automatic transmission, which is calculated by the second means, exceeds a second predetermined threshold value representing a torque variation;

fifth means connected to the lock-up clutch for deciding whether the lock-up clutch is in a lock-up state or a slip control state;

sixth means connected to the lock-up clutch, the third means, the fourth means, and the fifth means, for changing the lock-up clutch to the slip control state in cases where either the measure of time-domain variation in the rotational speed of the output shaft of the engine exceeds the first predetermined threshold value or the measure of time-domain variation in the rotational speed of the input shaft of the automatic transmission exceeds the second predetermined threshold value and where the lock-up clutch is in the lock-up state; and seventh means connected to the lock-up clutch, the third means, the fourth means, and the fifth means, for changing the lock-up clutch to a released state in cases where either the measure of time-domain variation in the rotational speed of the output shaft of the engine exceeds the first predetermined threshold value or the measure of time-domain variation in the rotational speed of the input shaft of the automatic transmission exceeds the second predetermined threshold value and where the lock-up clutch is in the slip control state.

8. An automatic transmission system according to claim 7, further comprising:

eighth means for calculating a measure of time-domain variation in a difference between the rotational speed of the output shaft of the engine and the rotational speed of the input shaft of the automatic transmission;

ninth means connected to the eighth means for deciding whether or not the measure of time-domain variation in the difference, which is calculated by the eighth means, exceeds a third predetermined threshold value representing a torque variation; and tenth means connected to the lock-up clutch and the ninth means, for changing the lock-up clutch from the slip control state to the released state when the ninth means decides that the measure of time-domain variation exceeds the third predetermined threshold value.

9. An automatic transmission system with a lock-up clutch and for use with an engine, comprising:

an automatic transmission having an input shaft and an output shaft;

a torque converter with a lock-up clutch, which is provided between the input shaft of the automatic transmission and an output shaft of the engine;

first means for calculating a measure of time-domain variation in a rotational speed of the output shaft of the engine;

second means for calculating a measure of time-domain variation in a rotational speed of the output shaft of the automatic transmission;

third means connected to the first means, for deciding whether or not the measure of time-domain variation in the rotational speed of the output shaft of the engine, which is calculated by the first means, exceeds a first predetermined threshold value representing a torque variation;

fourth means connected to the second means, for deciding whether or not the measure of time-domain variation in the rotational speed of the output shaft of the automatic transmission, which is calculated by the second means, exceeds a second predetermined threshold value representing a torque variation;

fifth means connected to the lock-up clutch, for deciding whether the lock-up clutch is in a lock-up state or a slip control state;

sixth means connected to the lock-up clutch, the third means, the fourth means, and the fifth means, for changing the lock-up clutch to the slip control state in cases where either the measure of time-domain variation in the rotational speed of the output shaft of the engine exceeds the first predetermined threshold value or the measure of time-domain variation in the rotational speed of the output shaft of the automatic transmission exceeds the second predetermined threshold value and where the lock-up clutch is in the lock-up state; and seventh means connected to the lock-up clutch, the third means, the fourth means, and the fifth means, for changing the lock-up clutch to a released state in cases where either the measure of time-domain variation in the rotational speed of the output shaft of the engine exceeds the first predetermined threshold value or the measure of time-domain variation in the rotational speed of the output shaft of the automatic transmission exceeds the second predetermined threshold value and where the lock-up clutch is in the slip control state.

* * * * *